United States Patent
Sono et al.

[11] Patent Number: 5,513,028
[45] Date of Patent: Apr. 30, 1996

[54] LIQUID CRYSTAL DISPLAY WITH DISPLAY AREA HAVING SAME HEIGHT AS PERIPHERAL PORTION THEREOF

[75] Inventors: Koichi Sono, Hiratsuka; Mamoru Miyawaki, Isehara; Akira Ishizaki, Atsugi; Katsuhisa Ogawa, Machida; Katsuhito Sakurai, Hadano; Shigetoshi Sugawa, Atsugi; Shigeki Kondo, Hiratsuka, all of Japan

[73] Assignee: Canon Kabushiki Kaisha, Tokyo, Japan

[21] Appl. No.: 419,762

[22] Filed: Apr. 10, 1995

Related U.S. Application Data

[63] Continuation of Ser. No. 21,549, Feb. 24, 1993, abandoned.

[30] Foreign Application Priority Data

Feb. 27, 1992 [JP] Japan .................. 4-075574
Jan. 18, 1993 [JP] Japan .................. 5-021641

[51] Int. Cl.$^6$ ............................... G02F 1/1343
[52] U.S. Cl. ................... 359/87; 359/82; 359/59
[58] Field of Search ............... 359/54, 59, 68, 359/82, 87, 75, 76, 77, 78

[56] References Cited

U.S. PATENT DOCUMENTS

| | | | |
|---|---|---|---|
| 5,040,041 | 8/1991 | Yamada et al. | 357/30 |
| 5,132,821 | 7/1992 | Nicholas | 359/68 |
| 5,285,301 | 2/1994 | Shirahashi et al. | 359/54 |
| 5,298,297 | 3/1994 | Takei | 359/78 |

FOREIGN PATENT DOCUMENTS

| | | |
|---|---|---|
| 0209112 | 1/1987 | European Pat. Off. . |
| 87116 | 3/1990 | Japan . |

OTHER PUBLICATIONS

Patent Abstracts of Japan, vol. 14, No. 286 (Jun. 20, 1990) (P-1064).
Patent Abstracts of Japan, vol. 15, No. 487 (Dec. 10, 1991) (P-1286).
Patent Abstract of Japan, vol. 7, No. 196 (Aug. 26, 1983) P-219).

*Primary Examiner*—William L. Sikes
*Assistant Examiner*—Huy Mai
*Attorney, Agent, or Firm*—Fitzpatrick, Cella, Harper & Scinto

[57] ABSTRACT

A liquid crystal display device has a pixel electrode substrate with a step defined by adjacent display and non-display areas. The display area has substantially the same height as a portion of the close periphery thereof. In the liquid crystal display device, the step is an electrically insulated dummy part which is not used as the display area. The dummy part has the same layer structure as the pixels in the display area.

17 Claims, 6 Drawing Sheets

LIQUID CRYSTAL DISPLAY WITH DISPLAY AREA HAVING SAME HEIGHT AS PERIPHERAL PORTION THEREOF

This application is a continuation of application Ser. No. 08/021,549, filed Feb. 24, 1993, now abandoned.

BACKGROUND OF THE INVENTION

1. Field of the Invention

The present invention relates to a liquid crystal display device for image display and the like.

2. Related Background Art

The characteristics required for the liquid crystal display device have become stricter in recent years. Now, the displayed image quality on such devices is required to be of the same level as in the ordinary CRT displays. Since the liquid crystal display device, the control of the orientation of the employed liquid crystal is a major factor governing the quality of the displayed image, uniform and optimum orientation in all parts of the display unit is essential. In general, orientation of the liquid crystal is controlled by an alignment control film provided on the surface of liquid crystal.

If such alignment control film has a surfacial step, the orientation of the liquid crystal varies (at such stepped portion) and is no longer uniform. However, the alignment control film particularly develops surfacial steps on the pixel electrode substrate because of the pixel electrodes, switching elements, wirings etc. on said substrate. Near the end of the display area, the film position becomes extremely low and the cell gap increases because of the absence of the adjacent pixel electrode, so that the display characteristics become inferior in such end portion of the display area.

Conventional liquid crystal display device is composed of two mutually adhered substrates bearing electrodes on the internal faces thereof and sandwiching a liquid crystal layer therebetween. Circuits for driving the liquid crystal display device are often provided in the peripheral area of the pixel areas.

Figure 1:
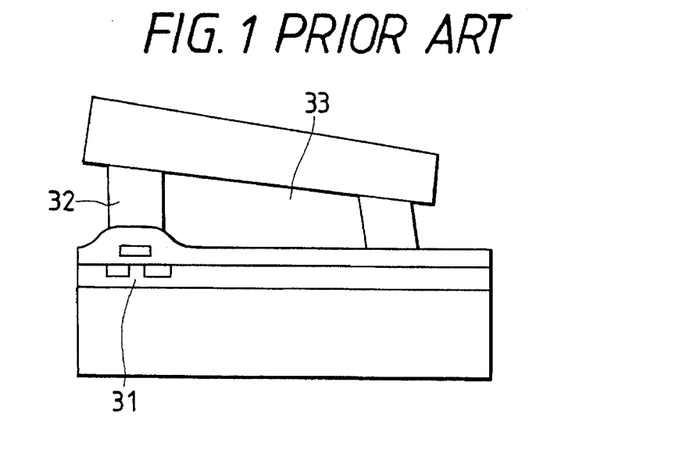
FIGS. 1 to 3 are schematic cross-sectional views of conventional liquid crystal display devices for showing drawbacks in the prior art.

In the mutual adhesion of both substrates, if a seal area 32 is formed on the peripheral circuits 31 as shown in FIG. 1, there is generated a distribution in the gap of the filled liquid crystal part 33. Unevenness in color is generated if the distribution gap exceeds ±0.1µ.

Figure 2:
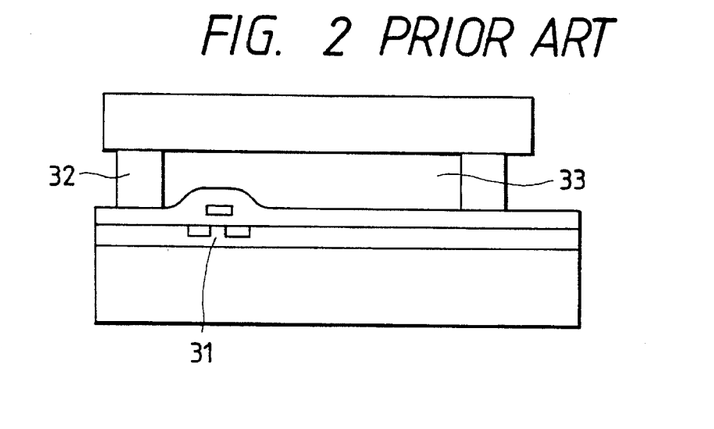

On the other hand, if the seal area 32 is provided outside the peripheral circuits 31 as shown in FIG. 2, the chip size becomes inevitably larger and cannot serve as a liquid crystal display device requiring a very small cell size, such as in a view finder.

Figure 3:
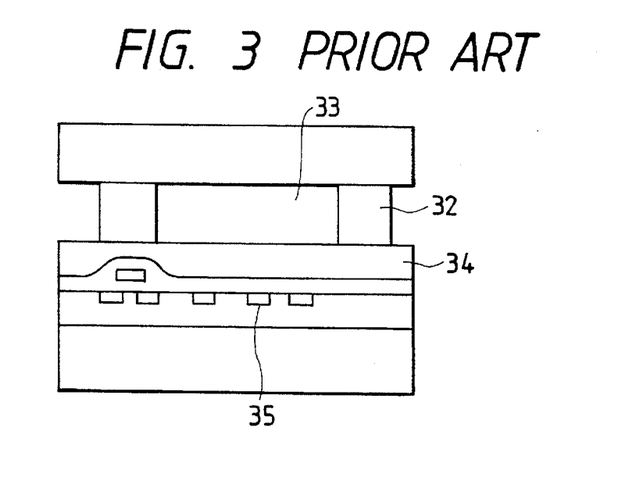

There is also known a method of forming an insulating planarization film 34 as shown in FIG. 3, but such requires the additional step of forming the planarization film 34, which also requires that the applied voltage be increased if the insulating layer becomes thicker on the pixel electrode. Also in case the substrate is composed of monocrystalline silicon substrate, the peripheral circuit steps are large so that the planarization layer 34 must be particularly thick, and an even larger applied voltage is required.

SUMMARY OF THE INVENTION

In consideration of the foregoing, an object of the present invention is to provide a liquid crystal display device showing uniform liquid crystal cell gap, without expansion in the chip size, and excellent in producibility.

Another object of the present invention is to provide a liquid crystal display device, in which the orientation of liquid crystal is uniformly controlled to the end portion of the display area, whereby the image of high quality can be displayed without unevenness over the entire image area.

Still another object of the present invention is to provide a liquid crystal display device not requiring an elevated driving voltage with excellent in power saving ability and reduced the size with respect to the image size.

Still another object of the present invention is to provide a liquid crystal display device, capable of attaining a uniform cell gap and avoiding unevenness in display color, without the additional steps in manufacture.

Still another object of the present invention is to provide a liquid crystal display device capable of image display of extremely high quality, without color variations over the entire display area including in the peripheral portions, even in case of color display.

Still another object of the present invention is to provide a liquid crystal display device having a stepped portion, in at least a part of the surrounding vicinity of the display area of the pixel electrode substrate, substantially same as the step in said display area.

DESCRIPTION OF THE PREFERRED EMBODIMENTS

The present invention is to provide a liquid crystal display device which is free from the foregoing drawbacks and is capable of providing the liquid crystal with uniform orientation even to the end portion of the device, thereby maintaining uniform display characteristics over the entire image area.

This objective can be attained according to the present invention by a liquid crystal display device which has a step, at least in a part of the surrounding vicinity of the display area of the pixel electrode substrate, substantially same as the step in said display area.

In the present invention, the formation of said step substantially same as the step in the display area provides a liquid crystal display device of high producibility, having a uniform liquid crystal cell gap, without the expansion of chip with respect to the display area.

Also the configuration of the present invention allows to provide sharp image display to the end portion of the display area, because the (e.g., the difference in height) between the display area and the surrounding area, and the resulting difference in the orientation characteristics of liquid crystal, are reduced to zero or are decreased significantly.

The alignment film of the liquid crystal display device is usually aligned by a rubbing process, and the formation of a step in the peripheral area enables uniform aligning process even to the peripheral area of the display area, so that the uniformity in the aligning property can be further secured and the image display of even higher quality can be achieved.

The above-mentioned step may be basically formed in any manner in the present invention, but, in consideration of adding no further complexities to the manufacturing process, it is preferable to form a dummy area to the pixel area. More specifically, in said dummy area, there may be formed dummy pixels of a same configuration, having same wirings, switching elements, pixel electrodes etc. as in the display area. In such case, the pixel electrodes are preferably insulated electrically, in order to avoid unnecessary voltage application. The formation of such same step by the formation of dummy pixels is easy in manufacture, because the manufacturing process of the pixels in the display area can be merely expanded and the additional steps are not required.

Also in the present invention, said step may be formed by the circuit elements or wiring provided in the peripheral area. In such case, the shape of the stepped portion is preferably same as that of the adjacent pixels, but the uniformity in cell gap, for example, can be attained even if these parts are of different shapes.

The above-mentioned dummy pixels can attain the above-mentioned objective, even if they have a different layer structure than the pixels in the display area.

In the present invention, said dummy pixels may be formed only as necessary around the display area, preferably in two mutually opposed sides, and more preferably in all four sides. The width of such step may vary depending upon the case, but, in case of said dummy pixels, sufficient effect can be attained with a width corresponding, for example, to five scanning lines or display lines.

The electrically insulated state used in this invention is not critical, and may be suitably selected according to the manufacturing process. For example, in case of a switching element composed of a transistor, such insulated state can be attained by not making electrical contact with at least one of the scanning line and the display line. Also, said insulated state can be realized by locally cutting off the wiring, or by not making connection with the driving circuit at the end portion.

Also, in case of effecting color display on the liquid crystal display device, a color filter of red, green or blue is attached to each pixel on the counter electrode substrate, and such color filters generate a step at the end portion because of the absence of adjacent color filter. The present invention can however maintain improved uniformity of the orientation of the liquid crystal, by forming a dummy filter in a portion corresponding to the dummy area on the pixel electrode substrate, thereby realizing the identical condition in said dummy area as in the display area.

It is also possible to render the displayed image sharper by forming an opaque layer in a portion corresponding to the dummy area, thereby rendering said dummy area completely black. It is furthermore possible to form the boundary between the dummy area and the display are under an opaque layer to define the display area by the aperture in said opaque layer, thereby facilitating the alignment of the dummy area and preventing the yield loss resulting from the defective alignment.

The specific configuration of the present invention will be described in detail in the following embodiments, but the present invention is not limited to the display devices of active matrix type shown in said embodiments.

It is to be noted that the present invention is by no means limited by the following embodiments, but is subject to suitable variations within the scope and spirit of the present invention, and it is naturally possible to suitably combine the following embodiments and the disclosures of the present specification.

Embodiment 1

Figure 4:
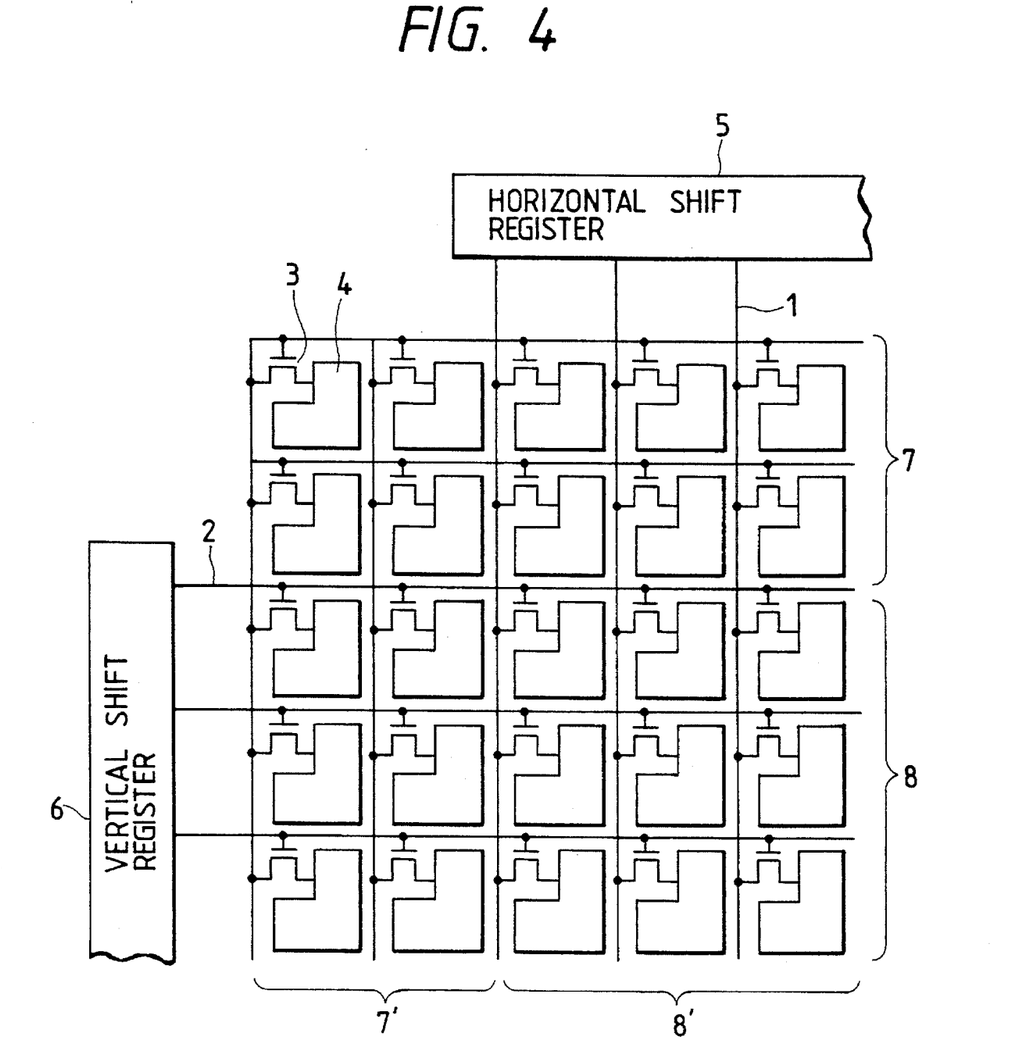
FIG. 4 is a schematic view of a liquid crystal display device of an embodiment 1.

FIG. 4 shows an embodiment 1 of the present invention, wherein shown are display lines 1; scanning lines 2; TFT (thin film transistor) elements 3; pixel electrodes 4; a horizontal shift register 5; a vertical shift register 6; dummy pixel rows 7; dummy pixel columns 7'; and a display area 8×8". Each dummy pixel is in an electrically insulated state, by not making the contact between the gate or source of the TFT element 3 and the scanning line 2 or the display line 1. This embodiment employs TFT elements as switching elements, and two display lines and two scanning lines are assigned for dummy pixels. By surrounding the display area with a dummy area as explained above, same orientation of the liquid crystal can be obtained in the end portions of the display area as in the central portion thereof, and image display of high quality can be attained.

Embodiment 2

Figure 5:
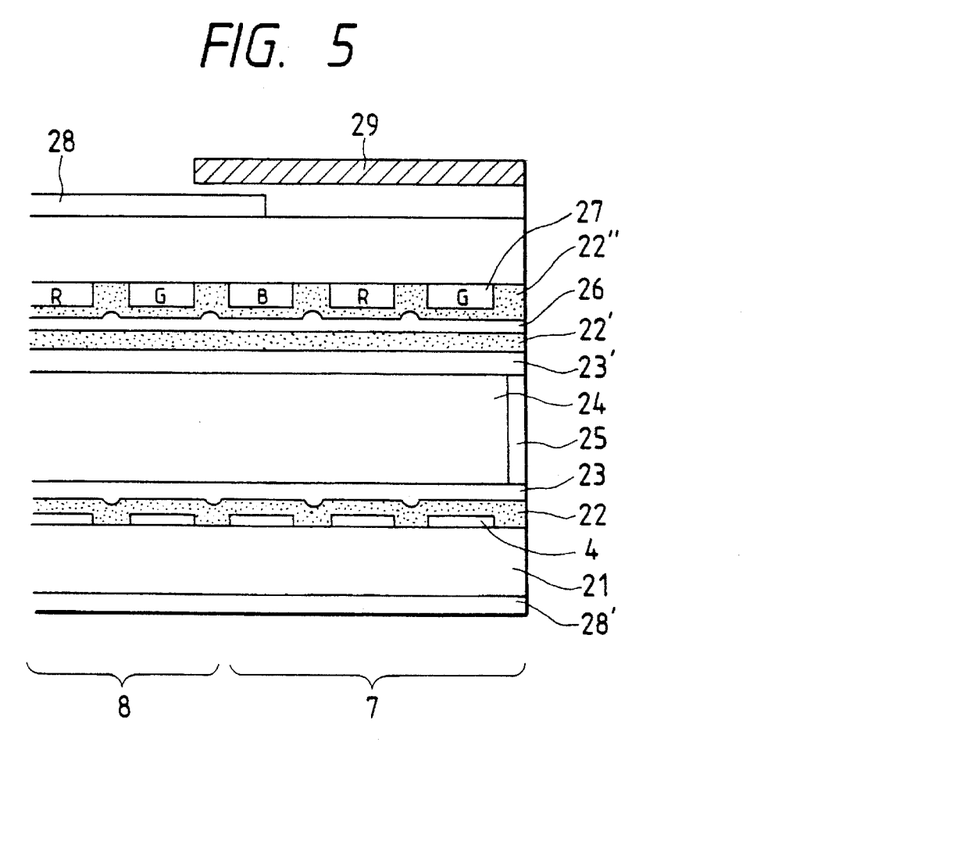
FIG. 5 is a schematic cross-sectional view of a liquid crystal display device of an embodiment 2.

FIG. 5 shows an end portion of the device of an embodiment 2, wherein shown are a TFT substrate 21; insulating layers 22, 22'; alignment films 23, 23'; liquid crystal 24; a sealing material 25; a counter electrode 26; a color filter 27; a polarizing plate 28; and a shield plate 29. In the present embodiment, three pixel electrodes 4 at the right-hand end constitute dummy pixels. In said dummy pixels, the TFT element (not shown) connected to each pixel electrode is connected to a scanning line and a display line, either of which is however not connected to the driving circuit, whereby said dummy pixels are maintained in electrically insulated state. Also the color filters corresponding to three pixels at the right-hand end constitute dummy filters.

Extremely splendid image display can be ensured by adopting a dummy structure same as in the display area not only on the TFT substrate but also on the opposed substrate.

The configuration of the present invention is particularly effective in case of color display, since even a slight perturbation in orientation appears conspicuously as a variation in color.

Embodiment 3

Figure 6:
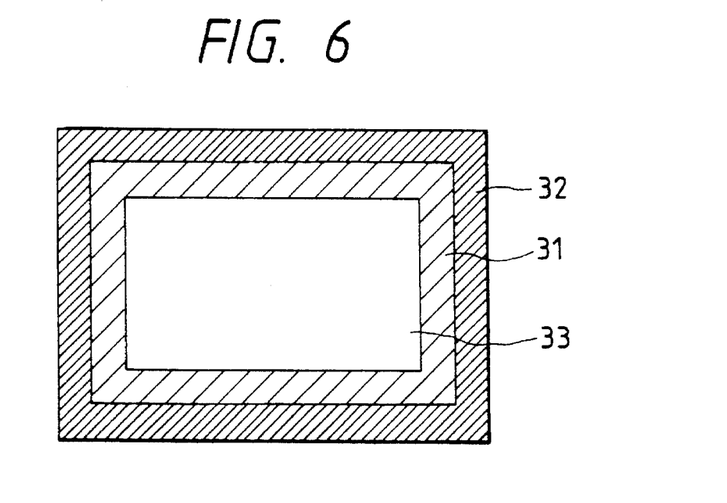
FIG. 6 is a schematic plan view of a liquid crystal display device of an embodiment 3.

FIG. 6 shows an embodiment 3 of the present invention, which is additionally equipped, in the configuration of the embodiment 2, with an opaque layer. As shown in FIG. 6, the opaque area is wider than the dummy area, and the display area 33 is defined by an aperture in said opaque area. The insulation state of the dummy area is same as in the embodiment 2. In this embodiment the display area is surrounded by a completely black area, so that the displayed image appears sharper.

Embodiment 4

Figure 7:
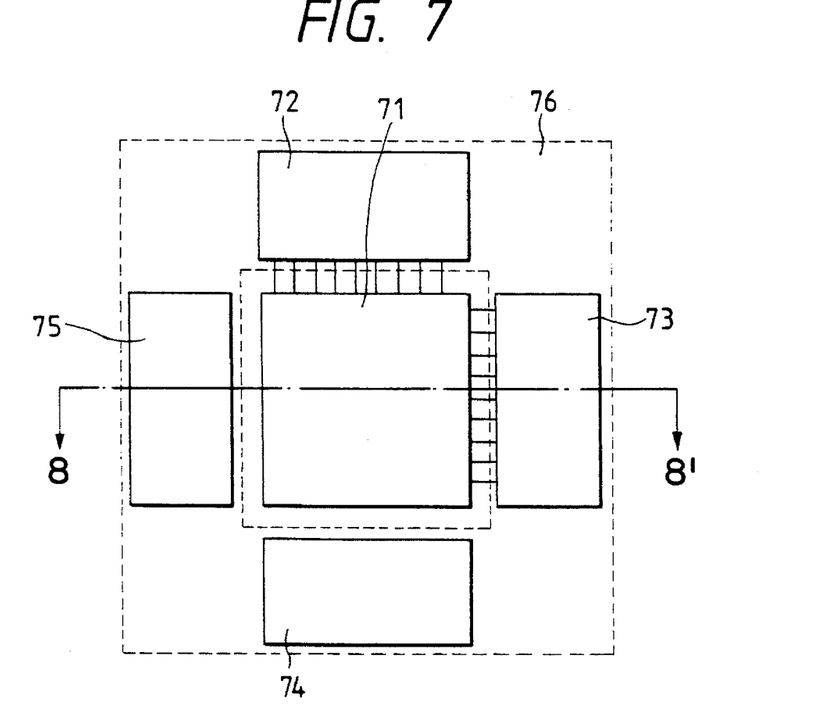
FIG. 7 is a schematic plan view of a liquid crystal display device of an embodiment 4.
Figure 8:
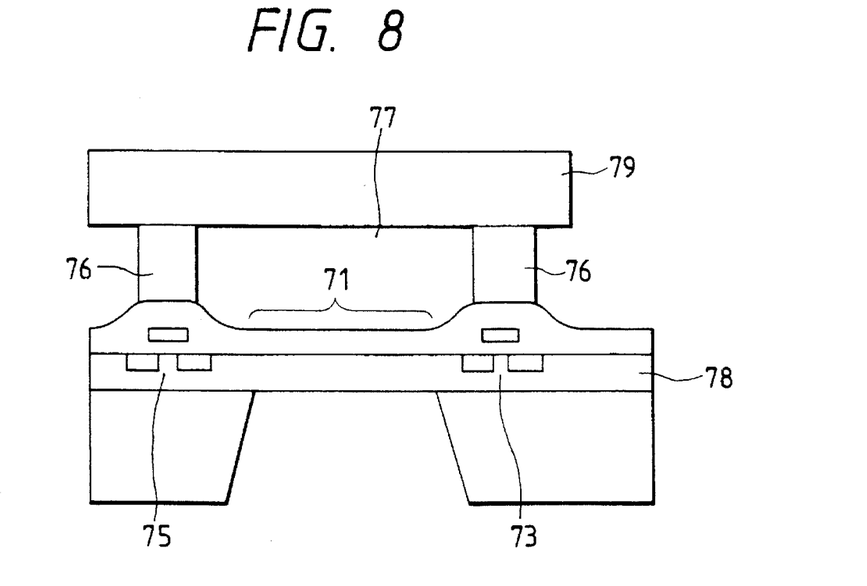
FIG. 8 is a schematic cross-sectional view of the liquid crystal display device shown in FIG. 7, along a line 8—8' therein.

FIG. 7 is a schematic plan view of a liquid crystal display device of the present embodiment, and FIG. 8 is a schematic cross-sectional view along a line 8-8' in FIG. 7. In FIGS. 7 and 8 there are shown a pixel area 71 including vertical signal lines, horizontal gate lines and a two-dimensional array of transistor switches positioned at the crossing points of said lines, for transferring signals to the corresponding pixel electrodes; a horizontal scanning circuit 72; a vertical scanning circuit 73 having a same atep as that of said horizontal scanning circuit 72; a horizontal dummy circuit 74 having a same step as that of said horizontal scanning circuit 72; a vertical dummy circuit 75 having a same step as that of said horizontal scanning circuit 72; a liquid crystal seal area 76; liquid crystal 77; a semiconductor substrate 78; and a counter substrate 79.

A semiconductor substrate 78 consists of a Si substrate, prepared by a process shown in FIGS. 9A to 9D. Said Si substrate consists of a Si monocrystalline substrate which is inexpensive, and uniform and flat over a large area, with extremely excellent crystallinity. As semiconductor active elements are formed on a monocrystalline Si layer with very little defects, the floating capacity of said semiconductor elements can be reduced. Thus there can be provided a liquid crystal display unit of high performance, in which elements and circuits capable of high-speed operation, with excellent antiradiation characteristics and without latch-up phenomenon, are integrated with the liquid crystal display pixels on a same substrate.

In the following there will be explained an example of the manufacturing method of the Si substrate according to FIGS. 9A to 9D.

Figure 9A:
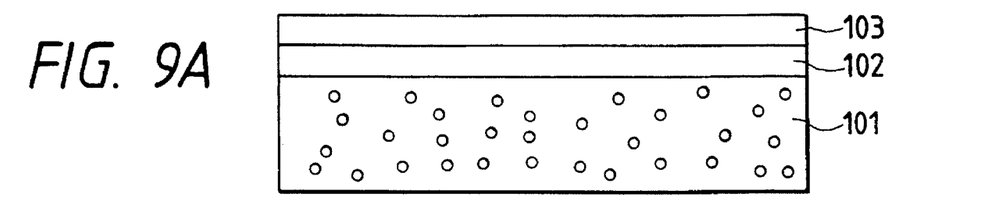
FIGS. 9A to 9D are schematic cross-sectional views showing steps of preparation of a semiconductor substrate adapted for use in the present invention.

A P-type (100) monocrystalline Si substrate of a thickness of 300 microns was subjected to anodization in HF solution to form a porous Si substrate 101.

Said anodization was conducted under the following conditions:

| | |
|---|---|
| voltage applied: | 2.6 V |
| current density: | 30 mA · cm$^{-2}$ |
| anodizing solution: | HF:H$_2$O:C$_2$H$_5$OH = 1:1:1 |
| duration: | 2.4 hours |
| thickness of porous Si: | 300 μm |
| porosity: | 56% |

On the P-type (100) porous Si substrate 101 thus prepared, a Si epitaxial layer 102 was grown with a thickness of 1.0 micron, by low pressure CVD. The conditions of deposition were as follows:

| | |
|---|---|
| source gas: | SiH$_4$ |
| carrier gas: | H$_2$ |
| temperature: | 850° C. |
| pressure: | 1 × 10$^{-2}$ Torr |
| growth rate: | 3.3 nm/sec. |

Figure 9B:
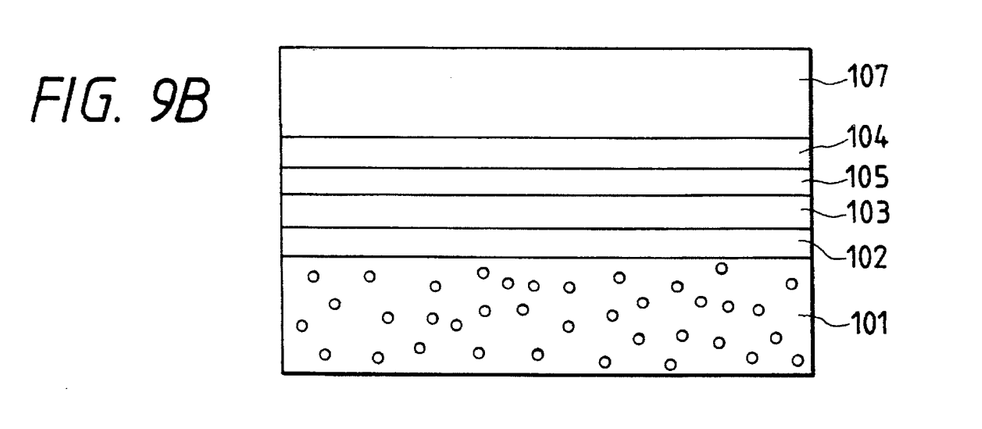

Subsequently an oxide layer 103 of a thickness of 1000 Å was formed on said epitaxial layer 102 (FIG. 9A). Then, the other Si substrate 107 on which an oxide layer 104 of a thickness of 5000 Å and a nitride layer 105 of a thickness of 1000 Å were formed was superposed and two Si substrates were firmly adhered by heating for 0.5 hours at 800° C. in nitrogen atmosphere (FIG. 9B).

Figure 9C:
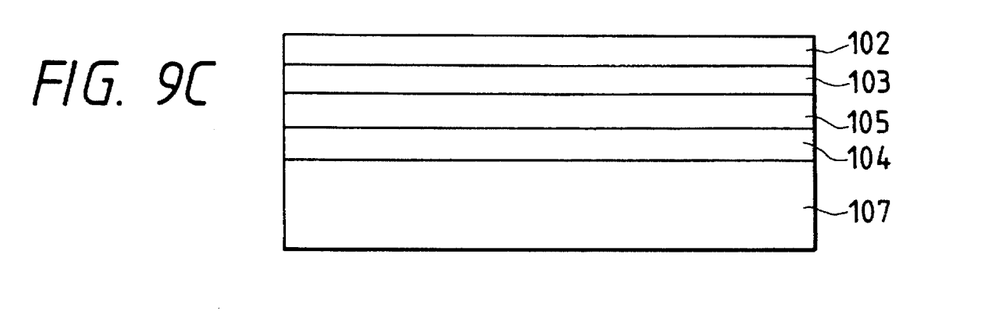

Then said adhered substrates were subjected to selective etching in a mixture of 49% hydrofluoric acid, alcohol and 30% hydroperoxide (10:6:50) without agitation. After 65 minutes, the porous Si substrate 101 was completely etched off, with the monocrystalline Si functioning as the etch stopping material, so that the non-porous Si layer alone remained. The etch rate of non-porous monocrystalline Si in the above-mentioned etching solution was very low, and the etched thickness was less than 50 Å even after 65 minutes. In fact the selective ratio of each rate to the porous layer was 10$^{-5}$ or less, so that the etched amount (several tens of Angstroms) in the non-porous layer was practically negligible. Thus the porosified Si substrate 101 of a thickness of 200μ was eliminated, and a monocrystalline Si layer 102 of a thickness of 1.0 μm could be formed on the SiO$_2$ layer 103. When the source gas was composed of SiH$_2$Cl, the growth temperature had to be elevated by several tens of degrees, but the elevated etching property specific to the porous substrate was maintained (see FIG. 9C. It is to be noted that FIG. 9C is shown upside down with respect to FIG. 9B).

Figure 9D:
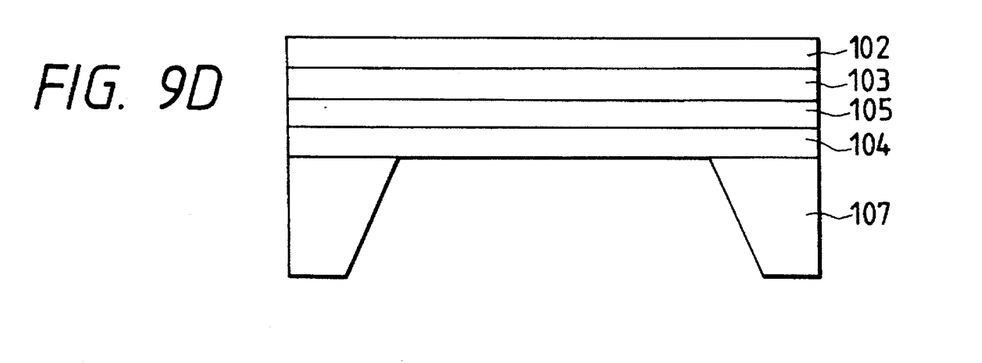

Then TFT's were formed on said monocrystalline silicon film 102, then the Si substrate was covered with rubber resistant to hydrofluoric acid except for the areas directly under the liquid crystal pixel areas, and the silicon substrate was locally removed to the insulation layer by means of a mixture of hydrofluoric acid, acetic acid and nitric acid thereby forming translucent areas 110. In this manner there could be obtained a substrate with TFT as shown in FIG. 9D.

The semiconductor substrate 8 may be composed of quartz glass instead of Si wafer, but the present invention is particularly effective in case of the monocrystalline Si substrate which is difficult to planarize as explained above.

The present embodiment can provide a uniform liquid crystal cell gap, because patterns 72–75 of a same step are provided on the four sides of a pixel area 71 on the semiconductor substrate 78, and liquid crystal sealing areas 76 are provided on said patterns. Also the chip size can be made smaller because said sealing areas 76 are formed on the peripheral scanning circuits 72, 73. Furthermore excellent producibility is ensured because the dummy circuits 74, 75 can be prepared in a same process as for the peripheral scanning circuits 72, 73.

Naturally the displayed image quality was excellent as in the foregoing embodiments.

Embodiment 5

Figure 10:
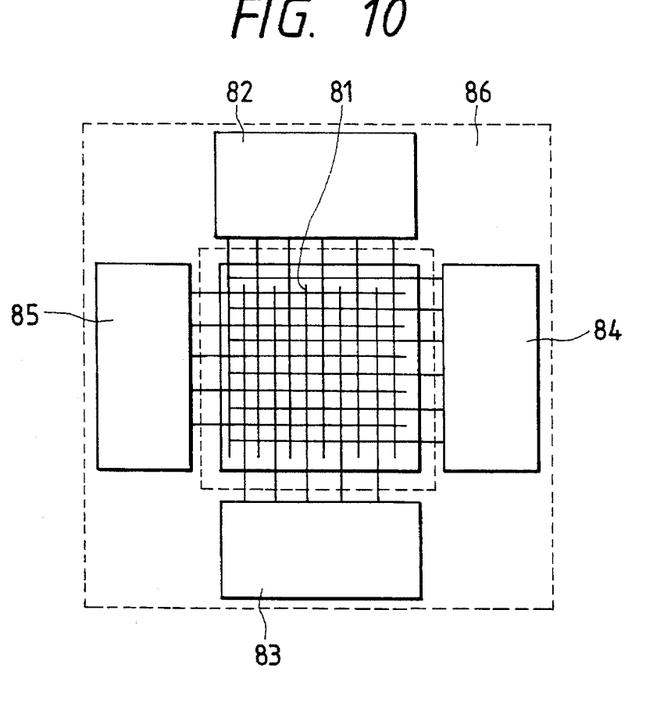
FIGS. 10 and 11 are schematic plan views of liquid crystal display devices of embodiments 5 and 6.

FIG. 10 is a plan view of a liquid crystal display device of the present embodiment, wherein shown are a display area 81 including vertical signal lines, horizontal gate lines and a two-dimensional array of transistor switches arranged at the crossing points of said lines, for transferring signals to pixel electrodes; a horizontal scanning circuit 82 for entering image signals to odd signal lines; a horizontal scanning circuit 83 for entering image-signals to even signal lines; a vertical scanning circuit 84 for entering gate signals to odd gate lines; a vertical scanning circuit 85 for entering gate signals to even gate lines; and a liquid crystal sealing area 86, said scanning circuits 82–85 having a same step height.

In the present embodiment, patterns 82–85 of a same step height are positioned on the four sides of the display area 81, and are all utilized as peripheral scanning circuits. Also this embodiment, like the embodiment 4, can achieve a uniform liquid crystal cell gap and a reduced chip size, because the liquid crystal sealing area 86 is formed on the peripheral scanning circuits 82–85 of a same step height.

Also in this embodiment the quality of the displayed image was excellent over the entire display area.

Embodiment 6

Figure 11:
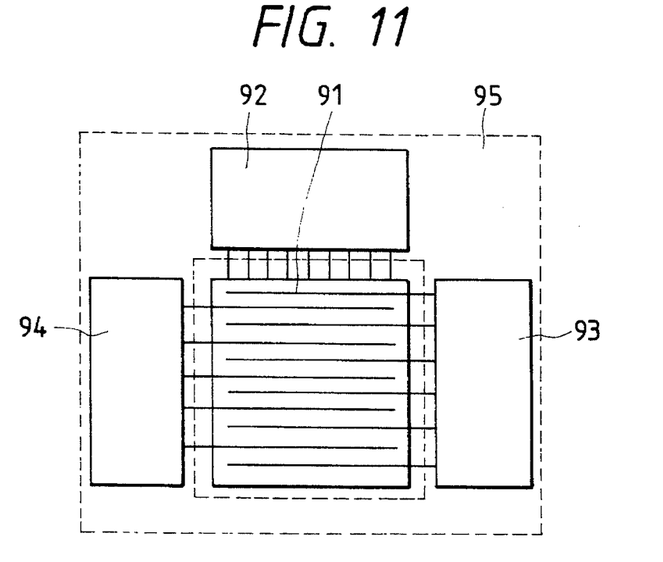

FIG. 11 is a plan view of a liquid crystal display device of the present embodiment, wherein shown are a display area 91 including vertical signal lines, horizontal gate lines, and a two-dimensional array of transistor switches arranged at the crossing points of said lines, for transferring signals to pixel electrodes; a horizontal scanning circuit 92; a vertical scanning circuit 93 for entering gate signals to odd gate lines; a vertical scanning circuit 94, having a same step height as that of the vertical scanning circuit 93, for entering gate signals to even gate lines; and a liquid crystal sealing area 95.

A sufficiently uniform liquid crystal cell gap can be attained, as in the present embodiment, by placing patterns 93, 94 of a same step height at least on two mutually opposed sides of the display area 91 and providing the liquid crystal sealing area 95 thereon. Also there can be attained a further reduced chip size, as will be apparent from FIG. 11.

In this embodiment, the steps are not formed on all the sides of the display area, but there can be obtained image display of extremely higher quality, in comparison with the case where such steps are absent.

As explained in the foregoing, the liquid crystal display device of the present invention can control the orientation of liquid crystal to the end portions of the display area, thereby enabling to display image of high quality without unevenness over the entire display area, by the formation of steps such as dummy circuits in the surrounding area of the display area.

Also the present invention can achieve power saving because an elevated driving voltage is not required, and can reduce the size of the liquid crystal display device with respect to the display area size.

Furthermore, the present invention can provide a liquid crystal display device of a uniform cell gap, thereby providing display without unevenness in color, without increase in the chip size and without addition of extra steps in the manufacture.

Furthermore, the present invention can provide color image display of extremely high quality, without unevenness in color even in the end portion of the display area.

The liquid crystal sealing area may be provided on an area of a substantially same step height as that of the display area, and may naturally be provided, not only on circuit elements but also on wirings or dummy areas of a same step height.

Also formation of an opaque area, corresponding to said stepped area, is effective for obtaining sharper image display.

In addition, the shape of the step, to be formed adjacent to the pixel area, may be made same as, substantially same as or similar to that of said pixel area by a dummy area, a circuit element or a wiring alone or by the combination thereof.

What is claimed is:

1. A liquid crystal display device, comprising:
a pixel electrode substrate having a display area and a non-display area adjacent said display area, wherein said non-display area comprises an electrically insulated dummy part not used as said display area, and wherein said dummy part has a height substantially the same as that of said display area and has a layer structure which is the same as that of a pixel in said display area.

2. A liquid crystal display device according to claim 1, wherein said display area and said dummy part have an alignment film.

3. A liquid crystal display device according to claim 1, wherein said dummy part has substantially the same shape as that of an adjacent pixel in said display area.

4. A liquid crystal display device according to claim 1, wherein said dummy part has a circuit element or a wiring.

5. A liquid crystal display device according to claim 4, wherein said circuit element or wiring has substantially the same shape as that of an adjacent pixel in said display area.

6. A liquid crystal display device according to claim 1, wherein said dummy part is formed in the surrounding areas of at least two mutually opposed sides of said display area.

7. A liquid crystal display device according to claim 1, wherein a liquid crystal sealing area is formed at a border between said display and non-display areas.

8. A liquid crystal display device according to claim 1, wherein a liquid crystal sealing area is formed on said dummy part.

9. A liquid crystal display device according to claim 4, wherein a liquid crystal sealing area is formed on said circuit element or wiring.

10. A liquid crystal display device according to claim 6, wherein a liquid crystal sealing area is formed on said dummy part provided in the surrounding areas of said mutually opposed two sides.

11. A liquid crystal display device according to claim 1, wherein said dummy part has a width of about five scanning lines or display lines in said display area.

12. A liquid crystal display device according to claim 1, wherein said pixel electrode substrate is provided with a thin film transistor.

13. A liquid crystal display device according to claim 1, wherein a counter electrode substrate, opposed to said pixel electrode substrate, is provided with a filter.

14. A liquid crystal display device according to claim 13, wherein said filter is a color filter.

15. A liquid crystal display device according to claim 13, wherein said filter is provided corresponding to at least a part of the display area.

16. A liquid crystal display device according to claim 1, wherein an opaque layer is provided within said non-display area.

17. A liquid crystal display device according to any of claims 1, 2–15 16, in which said non-display area extends around the periphery of said display area.

* * * * *

UNITED STATES PATENT AND TRADEMARK OFFICE
CERTIFICATE OF CORRECTION

PATENT NO. : 5,513,028
DATED : April 30, 1996
INVENTOR(S) : KOICHI SONO ET AL.

Page 1 of 2

It is certified that error appears in the above-identified patent and that said Letters Patent is hereby corrected as shown below:

COLUMN 1

Line 67, "and" should read --but with-- and "in" (second occurrence) should be deleted.

COLUMN 2

Line 8, "in" should be deleted.
Line 9, "the size" should read --size--.

COLUMN 3

Line 3, "because the" should read --because the step difference--.

COLUMN 4

Line 1, "are" should read --area--.

COLUMN 5

Line 7, "atep" should read --step--.

COLUMN 6

Line 48, "image-signals" should read --image signals--.

COLUMN 7

Line 21, "image" should read --images--.

UNITED STATES PATENT AND TRADEMARK OFFICE
CERTIFICATE OF CORRECTION

PATENT NO. : 5,513,028
DATED : April 30, 1996
INVENTOR(S) : KOICHI SONO ET AL.

Page 2 of 2

It is certified that error appears in the above-identified patent and that said Letters Patent is hereby corrected as shown below:

<u>COLUMN 8</u>

Line 52, "claims 1, 2-15 16," should read --claims 1 to 16--.

Signed and Sealed this

Eighth Day of October, 1996

Attest:

BRUCE LEHMAN

Attesting Officer

Commissioner of Patents and Trademarks